(12) United States Patent
Okubo et al.

(10) Patent No.: US 12,444,754 B2
(45) Date of Patent: Oct. 14, 2025

(54) ELECTROCHEMICAL OXYGEN REDUCTION CATALYST, AIR ELECTRODE, FUEL CELL, AND METAL-AIR CELL

(71) Applicant: TOYOTA JIDOSHA KABUSHIKI KAISHA, Toyota (JP)

(72) Inventors: Keiichi Okubo, Toyota (JP); Tsutomu Ioroi, Ikeda (JP); Shin-Ichi Yamazaki, Toyonaka (JP); Masafumi Asahi, Ikeda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 480 days.

(21) Appl. No.: 18/161,117

(22) Filed: Jan. 30, 2023

(65) Prior Publication Data

US 2024/0274838 A1  Aug. 15, 2024

(30) Foreign Application Priority Data

Mar. 28, 2022  (JP) .................. 2022-051204

(51) Int. Cl.
| | |
|---|---|
| *H01M 4/90* | (2006.01) |
| *H01M 4/92* | (2006.01) |
| *H01M 8/1018* | (2016.01) |
| *H01M 12/08* | (2006.01) |
| *H01M 4/86* | (2006.01) |
| *H01M 8/10* | (2016.01) |

(52) U.S. Cl.
CPC ......... *H01M 4/9008* (2013.01); *H01M 4/921* (2013.01); *H01M 4/925* (2013.01); *H01M 8/1018* (2013.01); *H01M 12/08* (2013.01); *H01M 2004/8689* (2013.01); *H01M 2008/1095* (2013.01)

(58) Field of Classification Search
CPC .... H01M 4/9008; H01M 4/921; H01M 4/925; H01M 8/1018; H01M 12/08; H01M 2004/8689; H01M 2008/1095
USPC .......................................... 429/482
See application file for complete search history.

(56) References Cited

U.S. PATENT DOCUMENTS

2008/0090721 A1   4/2008  Komoda
2017/0033368 A1*  2/2017  Carpenter ............. H01M 4/926
(Continued)

FOREIGN PATENT DOCUMENTS

DE    10 2007 046 547 A1    4/2008
EP           3796440 A1    3/2021
(Continued)

*Primary Examiner* — James M Erwin
(74) *Attorney, Agent, or Firm* — Dickinson Wright, PLLC

(57) ABSTRACT

There is provided an electrochemical oxygen reduction catalyst including metal particles having oxygen reduction activity, an additive, and primary particles of a carrier having pores, in which the additive is at least one organic nitrogen compound, the metal particles are supported on the carrier, and in a case where metal particles that are present on an outermost surface of the primary particles of the carrier are defined as outer particles, and metal particles that are present on an inner side of the outermost surface of the primary particles of the carrier are defined as inner particles, a ratio of a total surface area of the outer particles to a total surface area of the inner particles (the total surface area of the outer particles/the total surface area of the inner particles) is 0.36 or more.

18 Claims, 1 Drawing Sheet

(56) References Cited

U.S. PATENT DOCUMENTS

| | | | |
|---|---|---|---|
| 2017/0194653 A1* | 7/2017 | Imashiro | H01M 4/583 |
| 2020/0240026 A1* | 7/2020 | Baek | B01J 23/10 |
| 2021/0159512 A1* | 5/2021 | Yoo | H01M 4/8803 |
| 2021/0384524 A1 | 12/2021 | Asahi | |
| 2022/0263100 A1* | 8/2022 | Sato | B01J 35/64 |
| 2022/0302467 A1* | 9/2022 | Kobayashi | B01J 37/088 |
| 2022/0416258 A1 | 12/2022 | Asahi et al. | |

FOREIGN PATENT DOCUMENTS

| | | |
|---|---|---|
| EP | 4057427 A1 | 9/2022 |
| WO | 2019/221156 A1 | 11/2019 |
| WO | 2021/090746 A1 | 5/2021 |

\* cited by examiner

ELECTROCHEMICAL OXYGEN REDUCTION CATALYST, AIR ELECTRODE, FUEL CELL, AND METAL-AIR CELL

CROSS-REFERENCE TO RELATED APPLICATION

This application claims priority to Japanese Patent Application No. 2022-051204 filed on Mar. 28, 2022, incorporated herein by reference in its entirety.

BACKGROUND

1. Technical Field

The present disclosure relates to an electrochemical oxygen reduction catalyst, an air electrode, a fuel cell, and a metal-air cell.

2. Description of Related Art

Various studies have been carried out on electrochemical oxygen reduction catalysts.
WO 2019/221156 discloses a catalyst for electrochemical oxygen reduction, which contains at least one selected from the group consisting of a nanoparticle containing platinum, a melamine compound, a thiocyanuric acid compound, and a polymer containing the melamine compound or the thiocyanuric acid compound as a monomer.

SUMMARY

Even in a case where an additive is added to a catalyst, it is difficult for the additive to penetrate into pores of a carrier, and even in a case where the additive penetrates into the pores, there are problems that the additive cannot be present in a stable state, the additive cannot be sufficiently adsorbed to metal particles that are present inside the pores of the carrier, and thus the effect of the additive cannot be fully enjoyed, and the effect of improving the catalytic activity is small.

The present disclosure provides an electrochemical oxygen reduction catalyst that can improve catalytic activity.

An electrochemical oxygen reduction catalyst of a first aspect of the present disclosure includes metal particles having oxygen reduction activity, an additive, and primary particles of a carrier having pores.

The additive is at least one organic nitrogen compound, and the metal particles are supported on the carrier.

In a case where metal particles that are present on an outermost surface of the primary particles of the carrier are defined as outer particles, and metal particles that are present on an inner side of the outermost surface of the primary particles of the carrier are defined as inner particles, a ratio of a total surface area of the outer particles to a total surface area of the inner particles (the total surface area of the outer particles/the total surface area of the inner particles) is 0.36 or more.

An electrochemical oxygen reduction catalyst of a second aspect of the present disclosure includes metal particles having oxygen reduction activity, an additive, and primary particles of a carrier having pores.

The additive is at least one organic nitrogen compound, and the metal particles are supported on the carrier.

In a case where metal particles that are present on an outermost surface of the primary particles of the carrier are defined as outer particles, and metal particles that are present on an inner side of the outermost surface of the primary particles of the carrier are defined as inner particles, a ratio of a total number of the outer particles to a total number of the inner particles (the total number of the outer particles/the total number of the inner particles) is 0.37 or more.

An electrochemical oxygen reduction catalyst of a third aspect of the present disclosure includes metal particles having oxygen reduction activity, an additive, and primary particles of a carrier having pores.

The additive is at least one organic nitrogen compound, and the metal particles are supported on the carrier.

In a case where metal particles that are present on an outermost surface of the primary particles of the carrier are defined as outer particles, and metal particles that are present on an inner side of the outermost surface of the primary particles of the carrier are defined as inner particles, a ratio of a total volume of the outer particles to a total volume of the inner particles (the total volume of the outer particles/the total volume of the inner particles) is 0.43 or more.

In the electrochemical oxygen reduction catalyst of the above-described aspects of the present disclosure, the organic nitrogen compound may be a monomer represented by General Formula (1), (2) or (3), or a polymer at least partially containing the monomer.

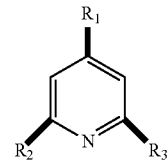

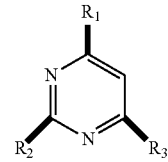

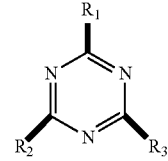

In General Formulae (1) to (3), $R_1$, $R_2$, and $R_3$ are each a hydrogen atom, a halogen atom, or a functional group selected from a group of functional groups consisting of a nitrile group, an amide group, an imine group, an amino group, a thiol group, a hydroxyl group, a sulfo group, a carboxylate group, a phosphate group, a ketone group, an aldehyde group, an ester group, an alkoxy group, a phenol group, a cyclopentyl group, a cyclohexyl group, an alkylamino group having 1 to 10 carbon atoms, an alkyl sulfonate group having 1 to 10 carbon atoms, a perfluoroalkyl group having 1 to 10 carbon atoms, an alkyl group having 1 to 10 carbon atoms, an alkenylamino group having 1 to 10 carbon atoms, an alkenyl sulfonate group having 1 to 10 carbon atoms, a perfluoroalkenyl group having 1 to 10 carbon atoms, and an alkenyl group having 1 to 10 carbon atoms, where the functional groups may each have, in the molecular chain, at least one selected from the group consisting of at least one functional group selected from the group of functional groups, an aromatic ring, a heterocyclic ring, an oxygen atom, a sulfur atom, a nitrogen atom, a fluorine atom, a chlorine atom, a bromine atom, an iodine atom, and a hydrogen atom.

In the electrochemical oxygen reduction catalyst of the first aspect of the present disclosure, the metal particle may be at least one selected from the group consisting of a platinum particle, a platinum alloy particle, and a composite particle containing platinum.

In the electrochemical oxygen reduction catalyst of the first aspect of the present disclosure, the metal particles may have a particle size of 1 nm to 5000 nm. The metal particles may have a particle size of 1 nm to 100 nm.

In the electrochemical oxygen reduction catalyst of the first aspect of the present disclosure, the primary particles of the carrier may have a particle size of 5 nm to 3000 nm. The primary particles of the carrier may have a particle size of 5 nm to 500 nm.

In the electrochemical oxygen reduction catalyst of the first aspect of the present disclosure, the carrier may be carbon having an electrical conductivity or an oxide having an electrical conductivity.

An air electrode of a fourth aspect of the present disclosure includes the electrochemical oxygen reduction catalyst and a polymer electrolyte having an ion exchange group.

An air electrode of the fourth aspect of the present disclosure may be for a fuel cell or a metal-air cell.

A fuel cell of a fifth aspect of the present disclosure has the air electrode as a cathode.

A metal-air cell of a sixth aspect of the present disclosure has the air electrode as a cathode.

According to the aspects of the present disclosure, it is possible to provide an electrochemical oxygen reduction catalyst that can improve catalytic activity.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
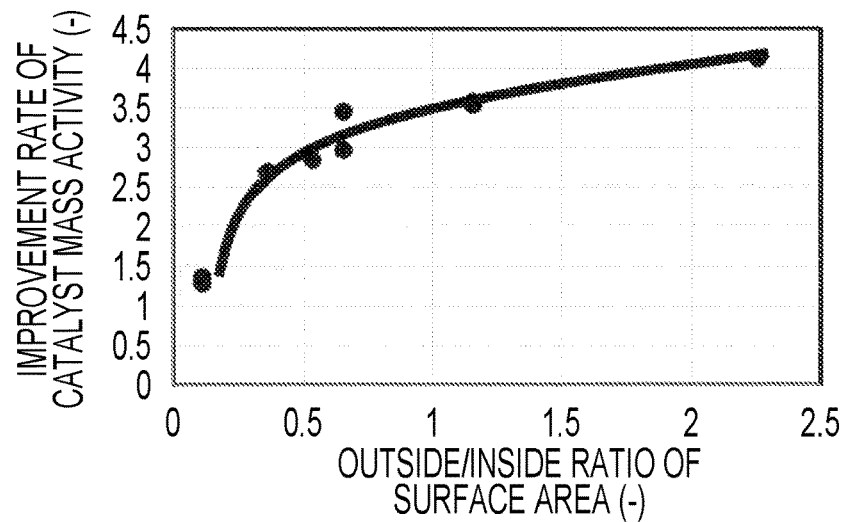
FIG. 1 is a graph showing a relationship between the outside/inside ratio of the surface area and the improvement rate of the catalyst mass activity.

Embodiments according to the present disclosure will be described below.

It is noted that matters other than matters particularly referred to in the present specification and demanded for carrying out the present disclosure (for example, a general configuration and manufacturing process of the electrochemical oxygen reduction catalyst, which do not characterize the present disclosure) may be understood as a design matter for persons skilled in the art based on the related art in the related field. The present disclosure can be carried out based on the contents disclosed in the present specification and the common general technical knowledge in the field.

In the present specification, "to" indicating a numerical range is used to mean that numerical values described before and after "to" are included as a lower limit value and an upper limit value, respectively.

In addition, in a numerical range, any combination of an upper limit value and a lower limit value can be employed.

1. Electrochemical Oxygen Reduction Catalyst

A first embodiment of the present disclosure provides an electrochemical oxygen reduction catalyst that is characterized by including metal particles having oxygen reduction activity, an additive, and primary particles of a carrier having pores, in which the additive is at least one organic nitrogen compound, the metal particles are supported on the carrier, and in a case where metal particles that are present on an outermost surface of the primary particles of the carrier are defined as outer particles, and metal particles that are present on an inner side of the outermost surface of the primary particles of the carrier are defined as inner particles, a ratio of a total surface area of the outer particles to a total surface area of the inner particles (the total surface area of the outer particles/the total surface area of the inner particles) is 0.36 or more.

A second embodiment of the present disclosure provides an electrochemical oxygen reduction catalyst that is characterized by including metal particles having oxygen reduction activity, an additive, and primary particles of a carrier having pores, in which the additive is at least one organic nitrogen compound, the metal particles are supported on the carrier, and in a case where metal particles that are present on an outermost surface of the primary particles of the carrier are defined as outer particles, and metal particles that are present on an inner side of the outermost surface of the primary particles of the carrier are defined as inner particles, a ratio of a total number of the outer particles to a total number of the inner particles (the total number of the outer particles/the total number of the inner particles) is 0.37 or more.

A third embodiment of the present disclosure provides an electrochemical oxygen reduction catalyst that is characterized by including metal particles having oxygen reduction activity, an additive, and primary particles of a carrier having pores, in which the additive is at least one organic nitrogen compound, the metal particles are supported on the carrier, and in a case where metal particles that are present on an outermost surface of the primary particles of the carrier are defined as outer particles, and metal particles that are present on an inner side of the outermost surface of the primary particles of the carrier are defined as inner particles, a ratio of a total volume of the outer particles to a total volume of the inner particles (the total volume of the outer particles/the total volume of the inner particles) is 0.43 or more.

In the electrochemical oxygen reduction catalyst of the present disclosure, the effect of the additive is increased by supporting metal particles, which are reaction active sites, on the outside of the carrier, whereby catalytic activity can be improved.

It suffices that the electrochemical oxygen reduction catalyst of the present disclosure satisfies at least one condition selected from the group consisting of (1) the ratio of the total surface area of the outer particles to the total surface area of the inner particles in the above-described specific range, (2) the ratio of the total number of the outer particles to the total number of the inner particles in the above-described specific range, and (3) the ratio of the total volume of the outer particles to the total volume of the inner particles in the above-described specific range, where two or more conditions may be satisfied, or all conditions may be satisfied.

The electrochemical oxygen reduction catalyst of the present disclosure includes metal particles having oxygen reduction activity, an additive, and primary particles of a carrier having pores.

The additive is at least one organic nitrogen compound.

The organic nitrogen compound may be a compound that satisfies a nitrogen equivalent of 20 g·eq$^{-1}$ to 270 g·eq$^{-1}$ or may be a compound that satisfies a nitrogen equivalent of 20 g·eq$^{-1}$ to 70 g·eq$^{-1}$, where the nitrogen equivalent indicates a dry weight per mole of nitrogen.

The nitrogen equivalent can be calculated from the following expression. It is noted that in a case of a polymer, a nitrogen equivalent of a monomer of the polymer is regarded as the nitrogen equivalent of the polymer.

Nitrogen equivalent (g·eq$^{-1}$)=molecular weight (g/mol)/ nitrogen substance amount in molecule (mol$_N$/mol)

The organic nitrogen compound may be a compound having an amine functional group, a compound having pyridine-type nitrogen, or a compound containing a triazine ring. The organic nitrogen compound may be a monomer represented by General Formula (1), (2) or (3) or a polymer at least partially containing the monomer.

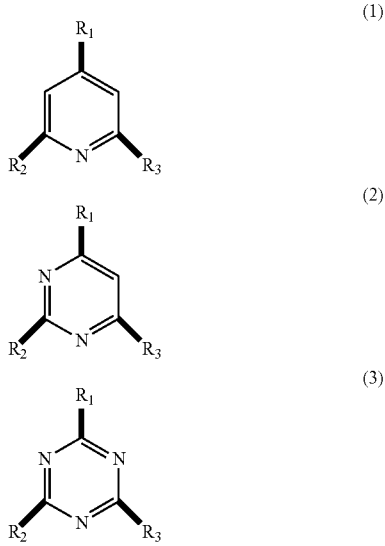

In General Formulae (1) to (3), $R_1$, $R_2$, and $R_3$ are each a hydrogen atom, a halogen atom, or a functional group selected from a group of functional groups consisting of a nitrile group, an amide group, an imine group, an amino group, a thiol group, a hydroxyl group, a sulfo group, a carboxylate group, a phosphate group, a ketone group, an aldehyde group, an ester group, an alkoxy group, a phenol group, a cyclopentyl group, a cyclohexyl group, an alkylamino group having 1 to 10 carbon atoms, an alkyl sulfonate group having 1 to 10 carbon atoms, a perfluoroalkyl group having 1 to 10 carbon atoms, an alkyl group having 1 to 10 carbon atoms, an alkenylamino group having 1 to 10 carbon atoms, an alkenyl sulfonate group having 1 to 10 carbon atoms, a perfluoroalkenyl group having 1 to 10 carbon atoms, and an alkenyl group having 1 to 10 carbon atoms, where the functional groups may each have, in the molecular chain, at least one selected from the group consisting of at least one functional group selected from the group of functional groups, an aromatic ring, a heterocyclic ring, an oxygen atom, a sulfur atom, a nitrogen atom, a fluorine atom, a chlorine atom, a bromine atom, an iodine atom, and a hydrogen atom.

$R_1$, $R_2$, and $R_3$ may each be a primary amine, a secondary amine, a tertiary amine, or a quaternary ammonium cation.

The organic nitrogen compound may be a melamine compound (nitrogen equivalent: 21 g·eq$^{-1}$), a thiocyanuric acid compound (nitrogen equivalent: 59 g·eq$^{-1}$), a cyanuric acid compound (nitrogen equivalent: 34 g·eq$^{-1}$), oleylamine (nitrogen equivalent: 267 g·eq$^{-1}$), tetradecylamine (nitrogen equivalent: 213 g·eq$^{-1}$), 2,4,6-tris[bis(methoxymethyl)amino]-1,3,5-triazine (nitrogen equivalent: 65 g·eq$^{-1}$), 6-(dibutylamino)-1,3,5-triazine-2,4-dithiol (nitrogen equivalent: 68 g·eq$^{-1}$), 2,4-diamino-6-butylamino-1,3,5-triazine (nitrogen equivalent: 30 g·eq$^{-1}$), 2,4,6-tris(pentafluoroethyl)-1,3,5-triazine (nitrogen equivalent: 145 g·eq$^{-1}$), and polymers containing these compounds as monomers, as well as poly(melamine-co-formaldehyde) methylated (nitrogen equivalent: 20 g·eq$^{-1}$ to 40 g·eq$^{-1}$), poly(melamine-co-formaldehyde) isobutylated (nitrogen equivalent: 20 to 40 g·eq$^{-1}$), and the like. The organic nitrogen compound may be melam, melem, melon, each of which is melamine condensate.

Also, two or more kinds of the above-described additives may be included.

As the melamine compound, the thiocyanuric acid compound, and the cyanuric acid compound, melamine, thiocyanuric acid, cyanuric acid, and derivatives thereof can be used without limitation.

Examples of the polymer containing the melamine compound, thiocyanuric acid compound, or cyanuric acid compound, as a monomer, include a melamine resin, thiocyanuric acid resin, or cyanuric acid resin, which has the above-described melamine compound, thiocyanuric acid compound, or cyanuric acid compound in the main chain of the repeating unit.

Among the above, the additive may be melamine (1,3,5-triazine-2,4,6-triamine) or a polymer of the melamine. In a case of a polymer, the adsorption stability is improved as compared with a case of a monomer since the polymer becomes difficult to be desorbed after being adsorbed on metal particles.

The metal particle may be any metal having an oxygen reduction catalytic activity. Examples of the metal include platinum, ruthenium, iridium, rhodium, palladium, osmium, tungsten, lead, iron, chromium, cobalt, nickel, manganese, vanadium, molybdenum, gallium, aluminum, lanthanum, cerium, praseodymium, neodymium, samarium, gadolinium, yttrium, zirconium, titan, copper, silver, and gold and two or more kinds of these metals may be used. In addition, the metal may be an oxide, a nitride, a sulfide, or a phosphide.

Among the above, the metal particle may be at least one selected from the group consisting of a platinum particle, a platinum alloy particle, and a composite particle containing platinum.

Examples of metals other than the platinum contained in the platinum alloy and the composite particle containing platinum include ruthenium, iridium, rhodium, palladium, osmium, tungsten, lead, iron, chromium, cobalt, nickel, manganese, vanadium, molybdenum, gallium, aluminum, lanthanum, cerium, praseodymium, neodymium, samarium, gadolinium, yttrium, zirconium, titan, copper, silver, and gold and the metals may include two or more kinds of these metals.

The element ratio of the metals other than the platinum in the platinum alloy is not particularly limited and may be 0.11 atm % to 50 atm %.

The particle diameter (the particle size) of the metal particles is not particularly limited and may be 1 nm to 5000 nm. The particle diameter of the metal particles may be 1 nm to 100 nm.

In the present disclosure, the particle size of particles is the average crystallite size measured according to the X-ray diffraction method.

The particle size of particles may be obtained by measuring the particle size of 100 to 1,000 particles with an electron microscope and taking the average value of these values as the average particle size of the particles. In the present disclosure, particle size was measured by the above two methods.

A carrier is primary particles having pores. In the present disclosure, in a case where a carrier contains primary particles having pores, the carrier may contain secondary particles in which the primary particles having pores are aggregated.

In the present disclosure, the pores are defined as pores present in a primary particle where the diameter satisfies 1 nm to 300 nm and the depth from the outermost surface of the primary particle is 1 nm or more.

The primary particle is the smallest unit of a carrier particle that cannot be decomposed.

The particle size of the primary particles of the carrier may be, for example, 5 nm to 3000 nm. The particle size of the primary particles of the carrier may be 5 nm to 500 nm.

The metal support ratio of the metal particles supported on the carrier is not particularly limited and may be 1% to 50% or may be 29% to 48%.

The carrier may be carbon, an oxide, or the like, or the carrier may be carbon having an electrical conductivity, an oxide having an electrical conductivity, or the like.

The carbon may be carbon black (acetylene black, Ketjen black, furnace black, or the like), activated carbon, graphite, glassy carbon, graphene, carbon fiber, carbon nanotube, carbon nitride, carbon sulfide, or carbon phosphide, or a mixture or the like containing at least two of these carbon materials.

The oxide may be a titanium oxide, a niobium oxide, a tin oxide, a tungsten oxide, or a molybdenum oxide, a mixture containing at least two of these oxides, or a mixture containing a carbon and at least one of these oxides.

In the electrochemical oxygen reduction catalyst of the present disclosure, the ratio of the weight of the additive to the weight of the carrier may be more than 0 and may be 0.01 or more.

Metal particles are supported on a carrier.

The method of supporting metal particles on a carrier is not particularly limited, and a known method in the related art can be appropriately employed.

In the electrochemical oxygen reduction catalyst of the present disclosure, metal particles that are present on an outermost surface of the primary particles of the carrier are defined as outer particles, and metal particles that are present on an inner side of the outermost surface of the primary particles of the carrier are defined as inner particles.

Evaluation Method for Existence Positions of Metal Particles Supported on Carrier As a method of measuring existence positions of metal particles supported on a carrier, there is an observation method using an electron microscope, or the like.

The observation angle of the electrochemical oxygen reduction catalyst to be measured is gradually changed to capture and reconstruct a plurality of images, whereby an image of an object can be captured three-dimensionally.

The coordinates of the center of gravity of the metal particles are three-dimensionally determined, and metal particles located on the outermost surface of the primary particles of the carrier are determined as outer particles, and metal particles located on the inner side of the outermost surface of the carrier are determined as inner particles.

In a case of selecting particles to be evaluated, the following procedures may be satisfied so that variation does not occur.

The number of particles to be evaluated may be 100 or more, particularly 200 or more, or even 1,000 or more.

Particles to be evaluated may be measured from multiple fields of view from at least two or more carrier aggregates (primary aggregates).

Particles to be evaluated may be measured from multiple fields of view from at least two or more carrier agglomerates (secondary aggregates).

Ratio of Total Surface Area of Outer Particles to Total Surface Area of Inner Particles (Outside/inside Ratio of Surface area)

In the electrochemical oxygen reduction catalyst of the present disclosure, it suffices that the ratio of the total surface area of the outer particles to the total surface area of the inner particles (the total surface area of the outer particles/the total surface area of the inner particles) is 0.36 or more, where 0.53 or more may be good, and the upper limit thereof, which is not particularly limited, may be, for example, 2.25 or less.

In the present disclosure, "the total surface area of the outer particles/the total surface area of the inner particles" is defined as "the outside/inside ratio of the surface area of the surface area". In a case where the outside/inside ratio of the surface area is 0.36 or more, the effect of improving catalytic activity due to the addition of an additive becomes high.

Ratio of Total Number of Outer Particles to Total Number of Inner Particles (Outside/inside Ratio of Number of Particles)

In the electrochemical oxygen reduction catalyst of the present disclosure, it suffices that the ratio of the total number of the outer particles to the total number of the inner particles (the total number of the outer particles/the total number of the inner particles) is 0.37 or more, where 0.39 or more may be good, and the upper limit thereof, which is not particularly limited, may be, for example, 1.14 or less.

In the present disclosure, "the total number of the outer particles/the total number of the inner particles" is defined as "the outside/inside ratio of the number of particles". In a case where the outside/inside ratio of the number of particles is 0.37 or more, the effect of improving catalytic activity due to the addition of an additive becomes high.

The total number of inner particles and the total number of outer particles can be calculated according to the above observation method using an electron microscope.

Ratio of Total Volume of Outer Particles to Total Volume of Inner Particles (Outside/Inside Ratio of Volume)

In the electrochemical oxygen reduction catalyst of the present disclosure, it suffices that the ratio of the total volume of the outer particles to the total volume of the inner particles (the total volume of the outer particles/the total volume of the inner particles) is 0.43 or more, where 0.72 or more may be good, and the upper limit thereof, which is not particularly limited, may be, for example, 3.42 or less.

In the present disclosure, "the total volume of the outer particles/the total volume of the inner particles" is defined as "the outside/inside surface area ratio of the volume". In a case where the outside/inside ratio of the volume is 0.43 or more, the effect of improving catalytic activity due to the addition of an additive becomes high.

Evaluation Method for Total Surface Area and Total Volume of Particles

A measured particle diameter (r) of the particles is defined as the maximum diameter.

The surface area and volume are calculated for every measured particle, summed up respectively for all the measured particles, and evaluated as the total surface area and the total volume, respectively.

Using a spherical model, the surface area (S) is calculated according to $S=2\pi(r/2)^2$.

Using a spherical model, the volume (V) is calculated according to $V=(4/3)\pi(r/2)^3$.

The surface area and the volume, which have been calculated for every particle, are summed up respectively for the outer particles and the inner particles and defined as the total surface area of the outer particles, the total surface area of the inner particles, the total volume of the outer particles, and the total volume of the inner particles.

Evaluation Method for Weight of Additive

An evaluation method for the weight of the additive contained in the electrochemical oxygen reduction catalyst of the present disclosure includes a method of measuring the nitrogen content by a CHN elemental analysis, a method of extracting the additive from the electrochemical oxygen reduction catalyst and directly measuring the additive, and the like.

The method of measuring the nitrogen content by a CHN elemental analysis is a method of burning a sample with oxygen for a certain period of time and then quantifying each of the amounts of carbon dioxide, water, and a nitrogen oxide generated, to quantify the amounts of carbon, hydrogen, and nitrogen atom contained in the sample. It is possible to evaluate the amount of the additive by comparing the amounts of nitrogen in samples before and after the introduction of the additive.

The method of extracting the additive from the electrochemical oxygen reduction catalyst and directly measuring the additive is a method of extracting an additive contained in the electrochemical oxygen reduction catalyst with a solvent that dissolves the additive and then subjecting the additive to a qualitative and quantitative analysis.

The analysis method includes chromatography, ultraviolet-visible spectroscopy (UV-vis), infrared spectroscopy (IR), nuclear magnetic resonance (NMR), and the like.

Evaluation Method for Metal Particle Weight

An evaluation method for the weight of the metal particles contained in the electrochemical oxygen reduction catalyst of the present disclosure includes thermogravimetric analysis (TG), high-frequency inductively coupled plasma emission spectroscopy (ICP), and the like.

Thermogravimetric analysis (TG) is a method of measuring a weight in a case where the gas atmosphere, the temperature, or the like is changed. The thermogravimetric analysis is a measurement method in which a weight remaining after carrying out heating to burn water, an electrical conductive carrier, a polymer having an ion exchange group, and impurities is taken as the weight of the metal particles.

High-frequency inductively coupled plasma emission spectroscopy (ICP) is a method of qualitatively and quantitatively analyzing contained elements from the wavelength and intensity of emitted rays emitted by atoms which have been subjected to plasma excitation.

It is possible to directly quantify the weight of the metal particles contained in the electrochemical oxygen reduction catalyst.

2. Air Electrode

In the present disclosure, the electrochemical oxygen reduction catalyst and an air electrode containing a polymer electrolyte having an ion exchange group are provided.

The air electrode of the present disclosure includes the electrochemical oxygen reduction catalyst of the present disclosure and a polymer electrolyte having an ion exchange group.

The air electrode of the present disclosure may be for a fuel cell or a metal-air cell.

The polymer electrolyte having an ion exchange group may be referred to as an electrolyte, an ionomer, or a binder. In the present disclosure, it will be described hereinafter, as a binder. The binder may be any polymer that exchanges ions, and the binder may have sulfonic acid, phosphoric acid, quaternary ammonium cations, or the like as the ion exchange group. The binder may be a perfluorocarbon sulfonic acid polymer, may be an anion exchange polymer, or may be a polymer having a polyether ether ketone, a polybenzimidazole, a perfluorocarbon phosphate polymer, a coordination polymer having an ion-exchange group or the like as a main component.

In the electrochemical oxygen reduction catalyst of the present disclosure, the ratio of the weight of the binder to the weight of the carrier may be more than 0 and may be 0.5 or more.

3. Fuel Cell

In the present disclosure, a fuel cell having the air electrode as a cathode is provided.

The fuel cell of the present disclosure has the air electrode of the present disclosure as a cathode.

In the fuel cell of the present disclosure, a configuration of a known fuel cell in the related art can be appropriately employed, except that the air electrode of the present disclosure is included as a cathode.

Since the fuel cell of the present disclosure uses, as a cathode, the air electrode containing the electrochemical oxygen reduction catalyst of the present disclosure, having high catalytic activity, it is possible to improve the power generation performance of the fuel cell.

4. Metal-Air Cell

In the present disclosure, a metal-air cell having the air electrode as a cathode is provided.

The metal-air cell of the present disclosure has the air electrode of the present disclosure as a cathode.

In the metal-air cell of the present disclosure, a configuration of a known metal-air cell in the related art can be appropriately employed, except that the air electrode of the present disclosure is included as a cathode.

Since the metal-air cell of the present disclosure uses, as a cathode, the air electrode containing the electrochemical oxygen reduction catalyst of the present disclosure, having high catalytic activity, it is possible to improve the power generation performance of the metal-air cell.

Example 1

An electrochemical oxygen reduction catalyst containing a platinum cobalt alloy (ratio of metals other than platinum: 0.13 atm %) particles (metal particle diameter: 3 nm to 4 nm) as metal particles, 1,3,5-triazine-2,4,6-triamine (melamine, manufactured by FUJIFILM Wako Pure Chemical Corporation) as an additive, and carbon (metal support ratio: 42 wt %) as a carrier on which metal particles were supported was prepared.

The weight of the additive to the weight of the carrier (the weight of the additive)/(the weight of the carrier) was calculated from the weights charged into the electrochemical oxygen reduction catalyst. The weight of the additive to the weight of the carrier was 0.1.

The outside/inside ratio of the surface area ratio, the outside/inside ratio of the number of particles, and the outside/inside ratio of the volume of the metal particles supported on the carrier were calculated by electron microscope observation of the electrochemical oxygen reduction catalyst. The results are shown in Table 1.

Example 2

An electrochemical oxygen reduction catalyst was prepared under the same conditions as in Example 1, except that platinum-nickel alloy (ratio of metals other than platinum: 0.13 atm %) particles (metal particle diameter: 3 nm to 4 nm) were used as metal particles, and the outside/inside ratio of the surface area, the outside/inside ratio of the number of particles, and the outside/inside ratio of the volume were the values shown in Table 1.

Example 3

An electrochemical oxygen reduction catalyst was prepared under the same conditions as in Example 1, except that platinum particles (metal particle diameter: 2 nm to 3 nm) were used as metal particles, the metal support ratio was 29 wt %, and the outside/inside ratio of the surface area, the outside/inside ratio of the number of particles, and the outside/inside ratio of the volume were the values shown in Table 1.

Example 4

An electrochemical oxygen reduction catalyst was prepared under the same conditions as in Example 1, except that platinum particles (metal particle diameter: 2 nm to 3 nm) as metal particles and a polymer of 1,3,5-triazine-2,4,6-triamine (melamine, manufactured by FUJIFILM Wako Pure Chemical Corporation) as an additive were used, the metal support ratio was 29 wt %, and the outside/inside ratio of the surface area, the outside/inside ratio of the number of particles, and the outside/inside ratio of the volume were the values shown in Table 2.

Example 5

An electrochemical oxygen reduction catalyst was prepared under the same conditions as in Example 1, except that platinum-cobalt alloy (ratio of metals other than platinum: 0.11 atm %) particles (metal particle diameter: 3 nm to 4 nm) were used as metal particles, the metal support ratio was 48 wt %, and the outside/inside ratio of the surface area, the outside/inside ratio of the number of particles, and the outside/inside ratio of the volume were the values shown in Table 2.

Comparative Example 1

An electrochemical oxygen reduction catalyst was prepared under the same conditions as in Example 1, except that platinum particles (metal particle diameter: 2 nm to 3 nm) were used as metal particles, the metal support ratio was 29 wt %, and the outside/inside ratio of the surface area, the outside/inside ratio of the number of particles, and the outside/inside ratio of the volume were the values shown in Table 2.

Comparative Example 2

An electrochemical oxygen reduction catalyst was prepared under the same conditions as in Example 1, except that platinum particles (metal particle diameter: 2 nm to 3 nm) as metal particles and a polymer of 1,3,5-triazine-2,4,6-triamine (melamine, manufactured by FUJIFILM Wako Pure Chemical Corporation) as an additive were used, the metal support ratio was 29 wt %, and the outside/inside ratio of the surface area, the outside/inside ratio of the number of particles, and the outside/inside ratio of the volume were the values shown in Table 3.

Example 6

An electrochemical oxygen reduction catalyst was prepared under the same conditions as in Example 1, except that platinum-cobalt alloy (ratio of metals other than platinum: 0.17 atm %) particles (metal particle diameter: 3 nm to 4 nm) were used as metal particles, and the outside/inside ratio of the surface area, the outside/inside ratio of the number of particles, and the outside/inside ratio of the volume were the values shown in Table 3.

Example 7

An electrochemical oxygen reduction catalyst was prepared under the same conditions as in Example 1, except that platinum particles (metal particle diameter: 2 nm to 3 nm) were used as metal particles, the metal support ratio was 48 wt %, and the outside/inside ratio of the surface area, the outside/inside ratio of the number of particles, and the outside/inside ratio of the volume were the values shown in Table 3.

Production of Electrode for Evaluation

Each of the electrochemical oxygen reduction catalysts of Examples 1 to 7 and Comparative Examples 1 and 2 and a perfluorocarbon sulfonic acid polymer (DE520 manufactured by FUJIFILM Wako Pure Chemical Corporation) as a binder were dispersed in a mixed solvent of 2-propanol and ultrapure water. The dispersion liquid was dropped onto a glassy carbon rotation electrode (diameter: 5 mm) manufactured by HOKUTO DENKO Corporation so that the carrier amount was 20 g/cm$^2$, and dried to prepare an electrode for evaluation. The weight of the binder with respect to the weight of the carbon (–) as a carrier in the electrode for evaluation was set to be 0.5.

Evaluation of Catalyst Mass Activity

An electrochemical measurement was carried out in a three-electrode system using each produced electrode for evaluation as a working electrode, a reversible hydrogen electrode as a reference electrode, and a carbon rod as a counter electrode.

As an electrolytic solution, a perchloric acid aqueous solution adjusted to 0.1 M with ultrapure water was used.

Cyclic voltammetry was carried out under an inert gas atmosphere.

Then, the gas atmosphere was changed to oxygen, and linear sweep voltammetry was carried out from the low potential side.

The linear sweep voltammetry measurement was repeated by changing the electrode rotation speed to 400, 900, 1,600, 2,000, 2,500, and 3,600 rpm.

A Kouteckey-Levich plot was created from the obtained potential-current characteristics, and the catalyst mass activity (A/g) during 0.9 Vv. s. RHE was calculated.

The catalyst mass activity is a value that is obtained by normalizing the performance index of the catalyst, referred to as catalytic activity, by the mass, and the catalyst mass activity is the current per weight of the metal particles. The current is a value that indicates the reaction rate of the electrochemical reaction, where it is meant that the higher the current, the higher the catalytic activity.

In addition, the catalyst mass activity of the electrochemical oxygen reduction catalyst containing the additive (the catalyst mass activity of the electrochemical oxygen reduction catalyst after introducing the additive) and the catalyst mass activity of the electrochemical oxygen reduction catalyst having the same configuration except that the additive is not contained (the catalyst mass activity of the electrochemical oxygen reduction catalyst before introducing the additive) were each calculated, and from these catalyst mass activities, the improvement rate of the catalyst mass activity was calculated. The results are shown in Tables 1 to 3.

The improvement rate of the catalyst mass activity is defined as (the catalyst mass activity of the electrochemical oxygen reduction catalyst after introducing the additive)/(the catalyst mass activity of the electrochemical oxygen reduction catalyst before introducing the additive).

Evaluation of Catalyst Surface Area Activity

Further, the surface area ($cm^2$) of the metal particles was calculated from the hydrogen adsorption current value of the reduction wave in the cyclic voltammogram. Then, the catalyst mass activity (A/g) was multiplied by the mass (g) of the metal particles and divided by the surface area ($cm^2$) of the metal particles to calculate the catalyst surface area activity ($A/cm^2$). The catalyst surface area activity is a value that is obtained by normalizing the performance index of the catalyst, referred to as catalytic activity, by the surface area, and the catalyst surface area activity is the current per surface area of the metal particles.

In addition, the catalyst surface area activity of the electrochemical oxygen reduction catalyst containing the additive (the catalyst surface area activity of the electrochemical oxygen reduction catalyst after introducing the additive) and the catalyst surface area activity of the electrochemical oxygen reduction catalyst having the same configuration except that the additive is not contained (the catalyst surface area activity of the electrochemical oxygen reduction catalyst before introducing the additive) were each calculated, and from these catalyst surface area activities, the improvement rate of the catalyst surface area activity was calculated. The results are shown in Tables 1 to 3.

The improvement rate of the catalyst surface area activity is defined as (the catalyst surface area activity of the electrochemical oxygen reduction catalyst after introducing the additive)/(the catalyst surface area activity of the electrochemical oxygen reduction catalyst before introducing the additive).

TABLE 1

|  | Example 1 | Example 2 | Example 3 |
|---|---|---|---|
| Metal | Platinum cobalt alloy | Platinum nickel alloy | Platinum |
| Ratio of metals other than platinum | 0.13 atm % | 0.13 atm % | 0.00 atm % |
| Metal support ratio | 42 wt % | 42 wt % | 29 wt % |
| Metal particle diameter | 3 nm to 4 nm | 3 nm to 4 nm | 2 nm to 3 nm |
| Carrier | Carbon | Carbon | Carbon |
| Binder | Perfluorosulfonic acid polymer | Perfluorosulfonic acid polymer | Perfluorosulfonic acid polymer |
| Weight of binder with respect to weight of carbon (—) | 0.5 | 0.5 | 0.5 |
| Additive | 1,3,5-triazine-2,4,6-triamine | 1,3,5-triazine-2,4,6-triamine | 1,3,5-triazine-2,4,6-triamine |
| Weight of additive with respect to weight of carbon (—) | 0.1 | 0.1 | 0.1 |
| Outside/inside ratio of surface area (—) | 0.65 | 0.65 | 1.15 |
| Outside/inside ratio of number of particles (—) | 0.45 | 0.45 | 0.47 |
| Outside/inside ratio of volume (—) | 0.82 | 0.82 | 1.56 |
| Improvement rate of catalyst mass activity (—) | 2.97 | 3.46 | 3.59 |
| Improvement rate of catalyst surface area activity (—) | 3.37 | 3.08 | 4.44 |

TABLE 2

|  | Example 4 | Example 5 | Comparative Example 1 |
|---|---|---|---|
| Metal | Platinum | Platinum cobalt alloy | Platinum |
| Ratio of metals other than platinum | 0.00 atm % | 0.11 atm % | 0.00 atm % |
| Metal support ratio | 29 wt % | 48 wt % | 29 wt % |
| Metal particle diameter | 2 nm to 3 nm | 3 nm to 4 nm | 2 nm to 3 nm |

TABLE 2-continued

|  | Example 4 | Example 5 | Comparative Example 1 |
|---|---|---|---|
| Carrier | Carbon | Carbon | Carbon |
| Binder | Perfluorosulfonic acid polymer | Perfluorosulfonic acid polymer | Perfluorosulfonic acid polymer |
| Weight of binder with respect to weight of carbon (—) | 0.5 | 0.5 | 0.5 |
| Additive | 1,3,5-triazine-2,4,6-triamine polymer | 1,3,5-triazine-2,4,6-triamine | 1,3,5-triazine-2,4,6-triamine |
| Weight of additive with respect to weight of carbon (—) | 0.1 | 0.1 | 0.1 |
| Outside/inside ratio of surface area (—) | 1.15 | 2.25 | 0.11 |
| Outside/inside ratio of number of particles (—) | 0.47 | 1.14 | 0.05 |
| Outside/inside ratio of volume (—) | 1.56 | 3.42 | 0.14 |
| Improvement rate of catalyst mass activity (—) | 3.54 | 4.14 | 1.30 |
| Improvement rate of catalyst surface area activity (—) | 7.78 | 4.54 | 2.17 |

TABLE 3

|  | Comparative Example 2 | Example 6 | Example 7 |
|---|---|---|---|
| Metal | Platinum | Platinum cobalt alloy | Platinum |
| Ratio of metals other than platinum | 0.00 atm % | 0.17 atm % | 0.00 atm % |
| Metal support ratio | 29 wt % | 42 wt % | 48 wt % |
| Metal particle diameter | 2 nm to 3 nm | 3 nm to 4 nm | 2 nm to 3 nm |
| Carrier | Carbon | Carbon | Carbon |
| Binder | Perfluorosulfonic acid polymer | Perfluorosulfonic acid polymer | Perfluorosulfonic acid polymer |
| Weight of binder with respect to weight of carbon (—) | 0.5 | 0.5 | 0.5 |
| Additive | 1,3,5-triazine-2,4,6-triamine polymer | 1,3,5-triazine-2,4,6-triamine | 1,3,5-triazine-2,4,6-triamine |
| Weight of additive with respect to weight of carbon (—) | 0.1 | 0.1 | 0.1 |
| Outside/inside ratio of surface area (—) | 0.11 | 0.36 | 0.53 |
| Outside/inside ratio of number of particles (—) | 0.05 | 0.39 | 0.37 |
| Outside/inside ratio of volume (—) | 0.14 | 0.43 | 0.72 |
| Improvement rate of catalyst mass activity (—) | 1.37 | 2.69 | 2.84 |
| Improvement rate of catalyst surface area activity (—) | 2.13 | 2.19 | 3.75 |

Evaluation Results

FIG. 1 is a graph showing a relationship between the outside/inside ratio of the surface area and the improvement rate of the catalyst mass activity.

Figure 2:
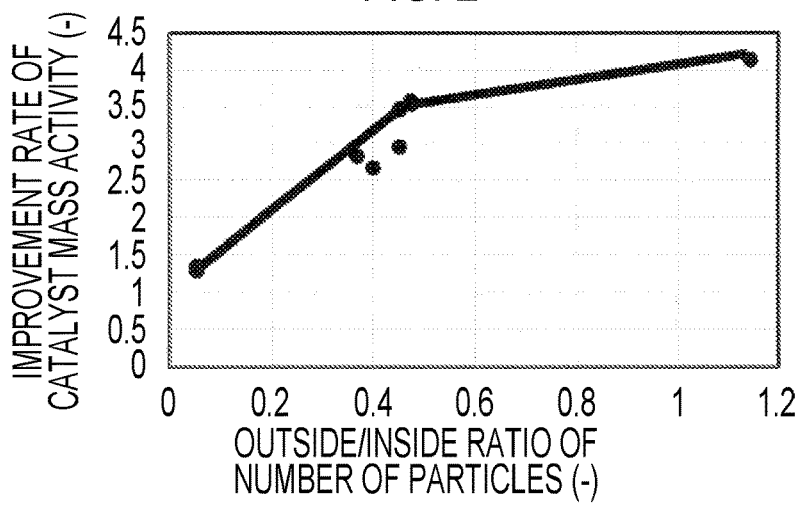
FIG. 2 is a graph showing a relationship between the outside/inside ratio of the number of particles and the improvement rate of the catalyst mass activity.

FIG. 2 is a graph showing a relationship between the outside/inside ratio of the number of particles and the improvement rate of the catalyst mass activity.

Figure 3:
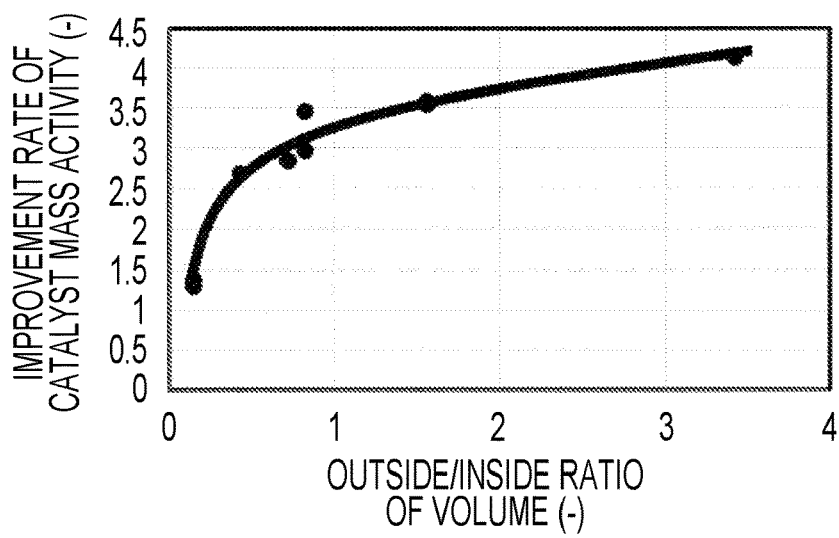
FIG. 3 is a graph showing a relationship between the outside/inside ratio of the volume and the improvement rate of the catalyst mass activity.

FIG. 3 is a graph showing a relationship between the outside/inside ratio of the volume and the improvement rate of the catalyst mass activity.

As shown in FIGS. 1 to 3 and Tables 1 to 3, it can be seen that in Examples 1 to 7, the improvement rate of the catalyst mass activity and the improvement rate of the catalyst surface area activity are high as compared with Comparative Examples 1 and 2.

From the above results, it has been demonstrated that in a case of satisfying at least one condition selected from the group consisting of the outside/inside ratio of the surface area of 0.36 or more, the outside/inside ratio of the number of particles of 0.37 or more, and the outside/inside ratio of the volume of 0.43 or more, it is possible to improve the catalytic activity of the electrochemical oxygen reduction catalyst.

What is claimed is:

1. An electrochemical oxygen reduction catalyst comprising:
    metal particles having oxygen reduction activity;
    an additive; and
    primary particles of a carrier having pores, wherein:
    the additive is at least one organic nitrogen compound;
    the metal particles are supported on the carrier; and
    in a case where metal particles that are present on an outermost surface of the primary particles of the carrier are defined as outer particles, and metal particles that are present on an inner side of the outermost surface of the primary particles of the carrier are defined as inner particles,
    a ratio of a total surface area of the outer particles to a total surface area of the inner particles (the total surface area of the outer particles/the total surface area of the inner particles) is 0.36 or more.

2. The electrochemical oxygen reduction catalyst according to claim 1, wherein the organic nitrogen compound is a monomer represented by General Formula (1), (2) or (3), or a polymer at least partially containing the monomer,

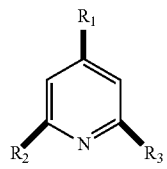

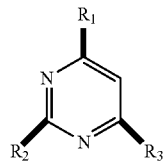

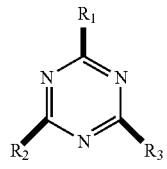

in General Formulae (1) to (3), $R_1$, $R_2$, and $R_3$ are each a hydrogen atom, a halogen atom, or a functional group selected from a group of functional groups consisting of a nitrile group, an amide group, an imine group, an amino group, a thiol group, a hydroxyl group, a sulfo group, a carboxylate group, a phosphate group, a ketone group, an aldehyde group, an ester group, an alkoxy group, a phenol group, a cyclopentyl group, a cyclohexyl group, an alkylamino group having 1 to 10 carbon atoms, an alkyl sulfonate group having 1 to 10 carbon atoms, a perfluoroalkyl group having 1 to 10 carbon atoms, an alkyl group having 1 to 10 carbon atoms, an alkenylamino group having 1 to 10 carbon atoms, an alkenyl sulfonate group having 1 to 10 carbon atoms, a perfluoroalkenyl group having 1 to 10 carbon atoms, and an alkenyl group having 1 to 10 carbon atoms, where the functional groups each have, in a molecular chain, at least one selected from the group consisting of at least one functional group selected from the group of the functional groups, an aromatic ring, a heterocyclic ring, an oxygen atom, a sulfur atom, a nitrogen atom, a fluorine atom, a chlorine atom, a bromine atom, an iodine atom, and a hydrogen atom.

3. The electrochemical oxygen reduction catalyst according to claim 1, wherein the metal particle is at least one selected from the group consisting of a platinum particle, a platinum alloy particle, and a composite particle containing platinum.

4. An air electrode comprising:
the electrochemical oxygen reduction catalyst according to claim 1; and
a polymer electrolyte having an ion exchange group.

5. A fuel cell comprising the air electrode according to claim 4 as a cathode.

6. A metal-air cell comprising the air electrode according to claim 4 as a cathode.

7. An electrochemical oxygen reduction catalyst comprising:
metal particles having oxygen reduction activity;
an additive; and
primary particles of a carrier having pores, wherein:
the additive is at least one organic nitrogen compound;
the metal particles are supported on the carrier; and
in a case where metal particles that are present on an outermost surface of the primary particles of the carrier are defined as outer particles, and metal particles that are present on an inner side of the outermost surface of the primary particles of the carrier are defined as inner particles,
a ratio of a total number of the outer particles to a total number of the inner particles (the total number of the outer particles/the total number of the inner particles) is 0.37 or more.

8. The electrochemical oxygen reduction catalyst according to claim 7, wherein the organic nitrogen compound is a monomer represented by General Formula (1), (2) or (3), or a polymer at least partially containing the monomer,

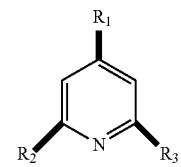

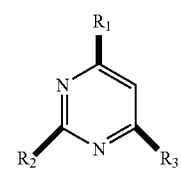

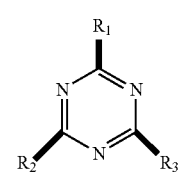

in General Formulae (1) to (3), $R_1$, $R_2$, and $R_3$ are each a hydrogen atom, a halogen atom, or a functional group selected from a group of functional groups consisting of a nitrile group, an amide group, an imine group, an amino group, a thiol group, a hydroxyl group, a sulfo group, a carboxylate group, a phosphate group, a ketone group, an aldehyde group, an ester group, an alkoxy group, a phenol group, a cyclopentyl group, a cyclohexyl group, an alkylamino group having 1 to 10 carbon atoms, an alkyl sulfonate group having 1 to 10 carbon atoms, a perfluoroalkyl group having 1 to 10 carbon atoms, an alkyl group having 1 to 10 carbon atoms, an alkenylamino group having 1 to 10 carbon atoms, an alkenyl sulfonate group having 1 to 10 carbon atoms, a perfluoroalkenyl group having 1 to 10 carbon atoms, and an alkenyl group having 1 to 10 carbon atoms, where the functional groups each have, in a molecular chain, at least one selected from the group consisting of at least one functional group selected from the group of the functional groups, an aromatic ring, a heterocyclic ring, an oxygen atom, a sulfur atom, a nitrogen atom, a fluorine atom, a chlorine atom, a bromine atom, an iodine atom, and a hydrogen atom.

9. The electrochemical oxygen reduction catalyst according to claim 7, wherein the metal particle is at least one selected from the group consisting of a platinum particle, a platinum alloy particle, and a composite particle containing platinum.

10. An air electrode comprising:
    the electrochemical oxygen reduction catalyst according to claim 7; and
    a polymer electrolyte having an ion exchange group.

11. A fuel cell comprising the air electrode according to claim 10 as a cathode.

12. A metal-air cell comprising the air electrode according to claim 10 as a cathode.

13. An electrochemical oxygen reduction catalyst comprising:
    metal particles having oxygen reduction activity;
    an additive; and
    primary particles of a carrier having pores, wherein:
    the additive is at least one organic nitrogen compound;
    the metal particles are supported on the carrier; and
    in a case where metal particles that are present on an outermost surface of the primary particles of the carrier are defined as outer particles, and metal particles that are present on an inner side of the outermost surface of the primary particles of the carrier are defined as inner particles,
    a ratio of a total volume of the outer particles to a total volume of the inner particles (the total volume of the outer particles/the total volume of the inner particles) is 0.43 or more.

14. The electrochemical oxygen reduction catalyst according to claim 13, wherein the organic nitrogen compound is a monomer represented by General Formula (1), (2) or (3), or a polymer at least partially containing the monomer,

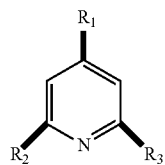

(1)

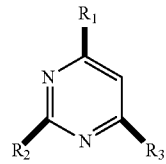

(2)

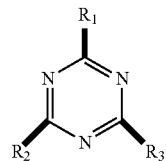

(3)

in General Formulae (1) to (3), $R_1$, $R_2$, and $R_3$ are each a hydrogen atom, a halogen atom, or a functional group selected from a group of functional groups consisting of a nitrile group, an amide group, an imine group, an amino group, a thiol group, a hydroxyl group, a sulfo group, a carboxylate group, a phosphate group, a ketone group, an aldehyde group, an ester group, an alkoxy group, a phenol group, a cyclopentyl group, a cyclohexyl group, an alkylamino group having 1 to 10 carbon atoms, an alkyl sulfonate group having 1 to 10 carbon atoms, a perfluoroalkyl group having 1 to 10 carbon atoms, an alkyl group having 1 to 10 carbon atoms, an alkenylamino group having 1 to 10 carbon atoms, an alkenyl sulfonate group having 1 to 10 carbon atoms, a perfluoroalkenyl group having 1 to 10 carbon atoms, and an alkenyl group having 1 to 10 carbon atoms, where the functional groups each have, in a molecular chain, at least one selected from the group consisting of at least one functional group selected from the group of the functional groups, an aromatic ring, a heterocyclic ring, an oxygen atom, a sulfur atom, a nitrogen atom, a fluorine atom, a chlorine atom, a bromine atom, an iodine atom, and a hydrogen atom.

15. The electrochemical oxygen reduction catalyst according to claim 13, wherein the metal particle is at least one selected from the group consisting of a platinum particle, a platinum alloy particle, and a composite particle containing platinum.

16. An air electrode comprising:
    the electrochemical oxygen reduction catalyst according to claim 13; and
    a polymer electrolyte having an ion exchange group.

17. A fuel cell comprising the air electrode according to claim 16 as a cathode.

18. A metal-air cell comprising the air electrode according to claim 16 as a cathode.

* * * * *